Andrew Collins and John Hardy.
Securing glass in locomotive head-light lamps.

116272  
PATENTED JUN 27 1871

Witnesses:  
Nutt R. Richards.  
D. H. Clarke

Inventors  
Andrew Collins and John Hardy  
by W. B. Richards, atty.

UNITED STATES PATENT OFFICE.

ANDREW COLLINS AND JOHN HARDY, OF GALESBURG, ILLINOIS; SAID HARDY ASSIGNOR OF HIS RIGHT TO SAID COLLINS.

IMPROVEMENT IN LOCOMOTIVE HEAD-LIGHTS.

Specification forming part of Letters Patent No. 116,272, dated June 27, 1871.

*To all whom it may concern:*

Be it known that we, ANDREW COLLINS and JOHN HARDY, of Galesburg, in the county of Knox and State of Illinois, have invented certain Improvements in Securing the Glass in Railway-Locomotive Head-Lights, of which the following is a specification:

The nature of our invention relates to improvements in the method of setting and securing the glass in railway-locomotive head-light lamps; and the invention consists in forming an annular flange, surrounding the circular opening in the side of said lamp, with a groove on its outer edge to receive a packing of rubber between the flange and the glass; a cap is then passed over the glass and the annular flange, and provided with ordinary devices for holding it securely in position. A rubber packing is also inserted between the cap and the glass, all as hereinafter fully described.

Figure 3:
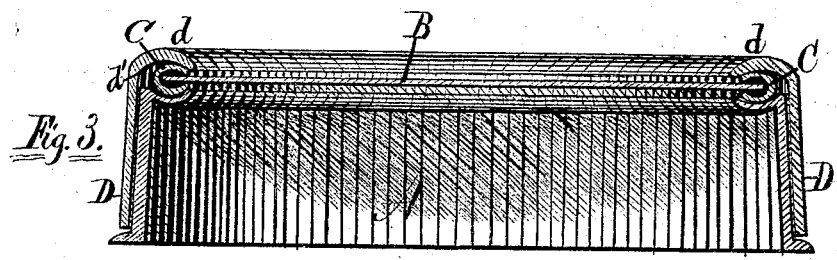
Figure 2:
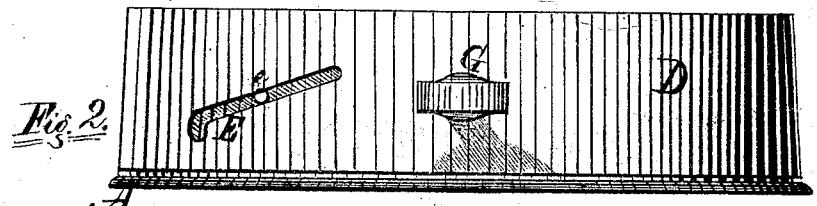
Figure 1:
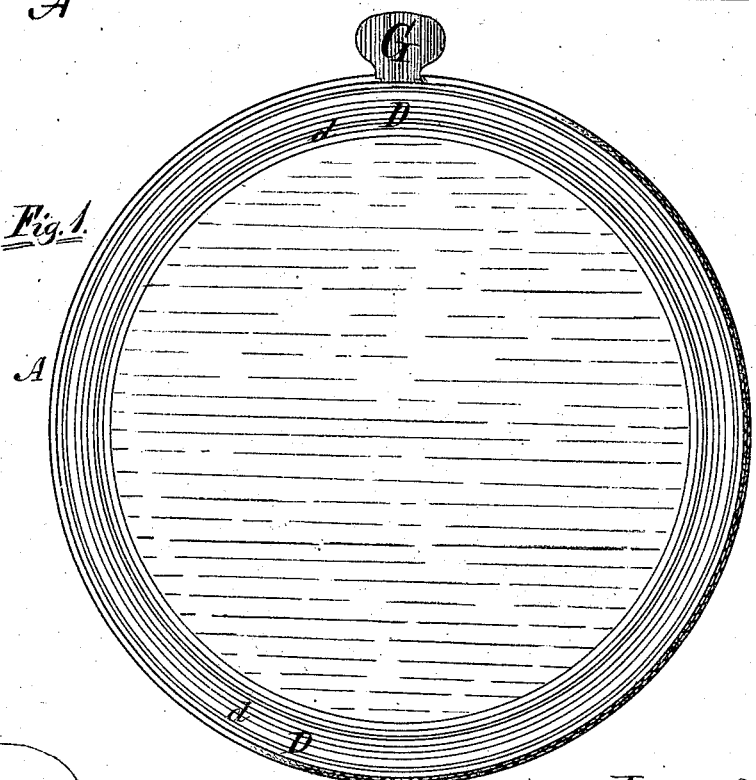

Figure 1 is a front elevation of our invention. Fig. 2 is a side view of Fig. 1. Fig. 3 is a cross-section of Fig. 1 on the line $x\ x$.

A represents a flange, surrounding and projecting from a circular opening in the side of a head-light lamp. The outer edge of the flange A is turned inward, and has a groove on its outer face, as shown at Fig. 3. B is a circular plate of glass. C is a piece of rubber hose or pipe, cut open its entire length, its two ends joined together and passed around the glass B, with the edge of the glass resting in the slit along its inner side, as shown at Fig. 3. D is a cap or ring fitting neatly over the flange A, and having an annular flange, $d$, on its outer edge extending inwardly as far as the interior edge of the flange A. On the inside surface of the flange $d$, and next the glass B, is an annular groove, $d'$. The cap D has the usual slots E cut diagonally on its sides, which pass over pins $e$ on the side of the flange A, and afford the usual facilities for drawing the flange $d$ down tightly onto the outer edge of the flange A, where it may be held firmly by a set-screw, G. The flanges A and D may be constructed of any suitable material, and instead of the rubber pipe being slit and passed around the edge of the glass B, as described, a piece of rubber pipe may be laid and extended around in the groove in the outer edge of the flange A, and a flat or circular piece of rubber be laid in the groove $d'$.

The operation of our invention is as follows: The rubber ring C being put in place on the glass B, the glass is then laid on the outer edge of flange A, with the rubber C resting in the groove thereon. The cap D is now put in place, and may be easily turned down so tightly as to bring the groove $d'$ so firmly onto the outer surface of the rubber C as to hold it securely and prevent the passage of rain or wind, the thumb-screw G being turned to prevent the cap jarring loose.

When the glass B is put in in the ordinary manner, with plaster of Paris, and gets broken, as frequently happens, it requires considerable time and some skill to insert another; whereas with our improvement, any one may in a very short time insert a new glass without the usual dirt and litter, and when inserted the packing is such that the glass is less liable to break than when put in with plaster, and is perfectly watertight.

We claim as our invention—

The glass B and rubber C, when arranged to operate with the flange A and cap D, substantially in the manner described and for the purpose specified.

ANDREW COLLINS.
JOHN HARDY.

Witnesses:
PLATT R. RICHARDS,
JOSHUA BAGGALEY.